(12) United States Patent
Wittenbecher

(10) Patent No.: US 6,416,327 B1
(45) Date of Patent: Jul. 9, 2002

(54) TRAINING DEVICE

(76) Inventor: Rainer Wittenbecher, Kortenwisch 5d, 22397 Hamburg (DE)

( * ) Notice: Subject to any disclaimer, the term of this patent is extended or adjusted under 35 U.S.C. 154(b) by 0 days.

(21) Appl. No.: 09/554,282

(22) PCT Filed: Nov. 9, 1998

(86) PCT No.: PCT/EP98/07135

§ 371 (c)(1),
(2), (4) Date: Jun. 23, 2000

(87) PCT Pub. No.: WO99/25430

PCT Pub. Date: May 27, 1999

(30) Foreign Application Priority Data

Nov. 13, 1997 (DE) ..................................... 297 20 110 U

(51) Int. Cl.$^7$ ............................................... A63B 69/36
(52) U.S. Cl. ...................... 434/247; 434/252; 473/222; 473/225
(58) Field of Search ................................ 434/247, 252, 434/257; 473/219, 220, 221, 222, 225, 459

(56) References Cited

U.S. PATENT DOCUMENTS 4,891,748 A    1/1990   Mann
5,577,981 A   11/1996   Jarvik
5,846,086 A *  12/1998  Bizzi et al. ................. 434/247
5,907,819 A *   5/1999  Johnson ....................... 702/152

FOREIGN PATENT DOCUMENTS

WO         9212768         8/1992
WO         9729814         8/1997

* cited by examiner

Primary Examiner—Kien T. Nguyen
(74) Attorney, Agent, or Firm—Friedrich Kueffner

(57) ABSTRACT

A training device for training the course of movement of a person by the manipulation of an object to be moved in a predetermined way has a data processing unit with which first sensors placed on the person are connected to transmit data of the movement to the data processing unit. Second sensors are placed on the object and connected to the data processing unit in order to transmit data of the movement of the object to the data processing unit. Mechanical actuating elements are placed on the object and connected to the data processing unit. They are triggered by the data processing unit to simulate contact with a virtual object as a tactile acknowledgement to the person. An indicator placed on the person and a memory for reference data are connected to the data processing unit, and the data processing unit calculates from the reference data the ideal course of movement of the body and the object and represents the ideal course of movement on the indicator.

16 Claims, 1 Drawing Sheet

TRAINING DEVICE

BACKGROUND OF THE INVENTION

1. Field of the Invention

The invention relates to a training device for training the course of movement off a person by manipulating an object to be moved by the person in a predetermined manner.

2. Description of the Related Art

For all manipulations of an object by a person, for example of a tennis racket by a tennis player, of a ball racket by a ballplayer or of a defensive weapon by an attacked person, it is essentially important to achieve an optimal course of movement of body and object in order to obtain with a minimal effort and a minimal physical effort a maximal effect such as, for example, a maximal ball speed or a maximal power transmission onto an attacker.

Here, there results the problem that this optimal course of movement is to be acquired and practiced strenuously and by a lengthy and repeated training. This problem will be discussed below with reference, as an example, to a tennis player however, it does concern in general all manipulations of an object by a person, for example for ball sports for which it must be acted with a ball racket onto a ball in a predetermined manner or for which a controlled travelling, rolling or gliding movement is to be carried out with gliding or rolling sports equipment such as skis, skateboards, inlineskates, snowboard etc.

Attention must be paid to the fact that an average tennis player plays relatively bad, that tennis training is lengthy, expensive and frustrating, that many learners thus loose the interest in it and that the possibilities of playing tennis are not exploited, even by professionals, because of the ignorance of certain stroke versions and stroke optima.

Therefore, the training progress of a training which is executed in a traditional way is, among others, so little or so strenuous because the learner does not know the "ideal course of movement" of a certain stroke, for example of serving when playing tennis.

Here, by "ideal" a stroke is to be understood for which the whole course of movement is optimally adapted to the personal anthropometric measures and kinematic qualities of the player so that, with a minimal expenditure of energy, the highest possible precision and energy of the desired stroke will be achieved and in order to place it on a predetermined trajectory onto a determined point on the playing field of the opponent.

It is true that the learner can observe his physical trainer, for example when serving, and learn therefrom but the question is to know if the trainer himself effects the stroke in an "ideal" manner or if he gets into the habit of a certain course of movement corresponding to the particular kinematics of his own body which cannot be copied by the learner by reason of his own personal anthropometric measures and kinematic qualities. Even if the trainer stroke turns out to be almost ideal, the course of movement is so quick and so complex that the learner hardly can perceive it, to say nothing of being able to convert it into an own optimal course of movement.

As a consequence thereof, the learner begins to grope for a course of movement, according to the "try and error" principle, which brings him a certain success after a certain time and thus which will be "programmed in". If the learner is very talented, has much luck or can afford many training hours, this programmed in course of movement approaches perhaps, in the course of time, the "ideal" course of movement. But possibly the course of movement is not correct, detrimental to health or at least disadvantageous and leads to the impasse of an unefficient play out of which the learner hardly finds his way because he does not know what else he must do and because the programmed in course of movement already reached a certain "automatism" which is hardly to be corrected.

In a very short time, the learner will make out "his limits" and loose the interest in tennis, since he plays average at the most, does not make any progress, or else the smallest progress has to be paid deerly for with a great expenditure of time and costs. He gives up, with perhaps negative consequences for his health and for the leisure industry.

SUMMARY OF THE INVENTION

The aim of this invention is to make available a training device of the above mentioned type which eliminates the above mentioned disadvantages and which makes possible an effective and simultaneously cost-effective training of a course of movement during the manipulation of an object.

This aim is achieved by a training device of the above mentioned type with the characteristics indicated in claim 1.

In this connection, the training device is characterized according to the invention by a data processing unit, first sensors connected with the data processing unit and placed on the person which transmit first data in connection with the movement of the person to the data processing unit, second sensors connected with the data processing unit and placed on the object which transmit second data in connection with the movement of the object to the data processing unit, mechanical actuating means connected with the data processing unit and placed on the object which, actuated triggered by the data processing unit, simulate a contact with a virtual object as a tactile acknowledgement to the person, an indicating means connected with the data processing unit and placed on the person and a memory for reference data, whereby the data processing unit is constructed in such a way that it calculates an ideal course of movement of body and object from the reference dates and alternatively represents (a) the ideal course of movement in the indicating means or (b) compares the ideal course of movement with an effective course of movement which results from the first and second data of the first and second sensors or (c) simultaneously represents in the indicating means the ideal course of movement and the effective course of movement detected by means of the first and second sensors.

This has the advantage that a biggest possible progress and training success is achieved by the fact that the person becomes acquainted with an ideal course of movement from the beginning and can observe this course as slowly as desired, as often as desired and from any angle of view. By a comparison of the ideal course of movement with a course of movement which has been effectively executed, the data processing unit can directly give hints for improving and for a further training in a precise and objective way which no human trainer could give. Due to the visual comparison of the course of movement which has been effectively executed with the ideal course of movement calculated by the data processing unit, the person immediately recognizes its own errors and can eliminate them. From the beginning, the person or the learner executes a personally best possible course of movement and programs it in, whereby every divergence is immediately noticed and can autonomously be corrected. The training progress and thus the motivating training success are therefore particularly important.

Preferable further developments of the device are described in the following.

There also results a particularly realistic representation, if the data processing unit is also constructed in such a way that, from the reference data and the first and second data, it calculates a movement trajectory of the second object in space and represents it on the indicating means.

In a preferred embodiment of the invention, the object is a sports apparatus, for example a tennis racket, a badminton racket, a table tennis racket, a squash racket, a golf club, a baseball bat, a throwing hammer, a javelin or the like, or skis, skates, snowboards, inlineskates, skateboards or the like, or a sword, a bat, an epee, a foil, an axe, a defensive weapon or the like.

In a realistic simulation, the virtual object is for example a ball or a virtual person and/or a virtual object led by the virtual person or a snow slope, the route of a fun park, the course for skateboards, inlineskates etc.

For an optimal data acquisition as a calculation basis for the data processing unit, the first sensors are data gloves and/or data shoes.

In an appropriate way, the indicating means is a display.

In an advantageous further development of the invention, the indicating means is integrated into a helmet or a cap (for example a cyberspace mask or cyberspace helmet).

In order to obtain an original pattern or a reference pattern of an ideal course of movement, the reference data comprise anthropometric measures and/or kinematic parameters of the body of an average person and the ideal course of movement is determined on the base of these data.

The person can observe the ideal stroke on oneself and obtain a much improved training success by the fact that the reference data comprise anthropometric measures and/or kinematic parameters of the person and the personally ideal course of movement is determined on the base of these data.

In an appropriate way, the reference data comprise static and dynamic properties of the object such as rigidity and size of a tennis racket as well as, if necessary, dimensions of the court, net height, net width, the surface structure of a place such as for example sand, lawn or carpet and/or further parameters.

Immediate and precise indications for the training result from the fact that, in case (b) the data processing unit is constructed in such a way that from the comparison of the courses of movement there emerge data which correspond to the divergences between the ideal and the effective courses of movement.

The person recognizes further hints as to errors in the course of movement which has effectively been executed in a simple and quick way since, in case (c) the data processing unit is constructed in such a way that divergences of the effective course of movement detected by the first and second sensors with respect to the ideal course of movement are, for example, stressed in color.

A graphic and reality-orientated representation of a virtual object is obtained by the fact that two lasers connected with the data processing unit and controlled by the data processing unit are provided for, the crossing point of their laser beams corresponding to the place in space of the second object.

In an appropriate way, several virtual objects are provided for, whereby two laser beams are assigned to each virtual object and the respective crossing point of two laser beams corresponding to a place in space of the respective virtual object.

BRIEF DESCRIPTION OF THE DRAWINGS

The invention will be explained in detail below with reference to the attached drawing in FIG. 1.

DESCRIPTION OF PREFERRED EMBODIMENTS

Figure 1:
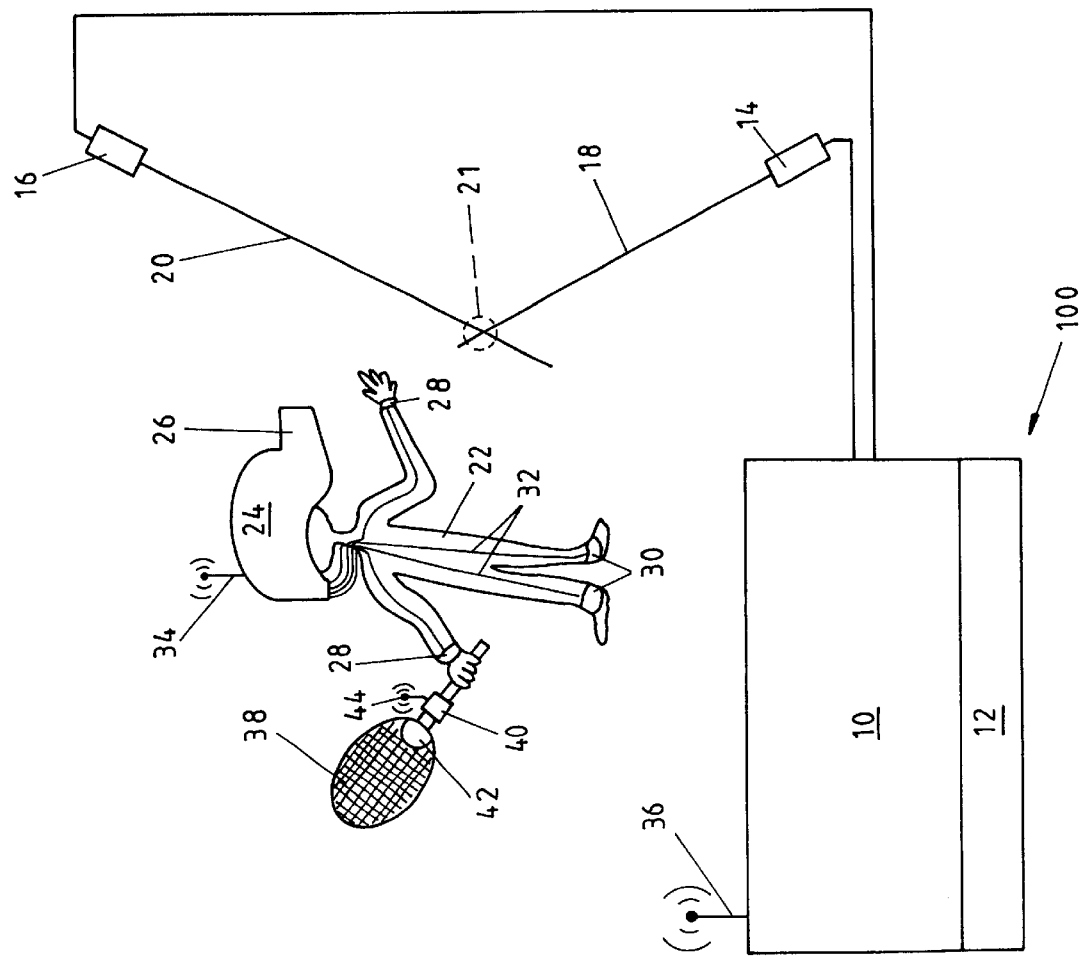
FIG. 1 shows a preferred embodiment of the training device according to the invention in a schematic representation.

The device according to the invention can be used everywhere where a body such as, for example, a sports apparatus or a weapon or a defensive weapon, is to be moved in a determined way, whereby only a certain optimal course of movement of body and object leads to the desired success. The device will be described below with a tennis racket as an example. However, the term "tennis racket" is here used as a synonym for any object to be moved with the body such as a badminton racket, a table tennis racket, a squash racket, a golf club, a baseball bat, a throwing hammer, a hockey stick, a ball racket, a sword, an epee, a foil, an axe, skis, skateboards, inlineskates or the like.

The preferred embodiment of a training device 100 according to the invention represented in the figure comprises a data processing unit 10 with a memory 12 for reference data and two laser guns 14 and 16 controlled by the data processing unit which respectively emit one laser beam 18 and 20. The crossing point of the laser beams 18 and 20 marks a staying place of a virtual ball 21 in space.

Furthermore, a helmet 24 with an integrated indicating means 26 and sensors 28 and 30 are placed on a person 22. The sensors 28 and 30 are connected with the helmet 24 by means of a cable 32 and the helmet, in its turn, is in contact with the data processing unit 10 over a radio link by means of the antennae 34 and 36.

The data processing unit 10 receives data from the sensors 28, 30 over the radio link and transmits indicating data to the indicating means 26. This indicating means is, for example, a display integrated in the helmet 24, for example a cyberspace mask which completely surrounds the visual range of the person 22 and gives a picture of a virtual tennis court. The representation on the indicating means 26 is continuously updated by the data processing unit 10 depending on the data of the sensors 28 and 30, i.e. when the person 22 moves, his position on the virtual tennis court represented in the indicating means 26 also changes. Moreover, the indicating means represents the virtual ball 21, whereby the virtual ball 21 is on the virtual tennis court at the crossing point of the laser beams with respect to the person 22.

A tennis racket 38 held and moved by the person additionally comprises sensors 40 and mechanical actuating means 42. A further radio link to the data processing unit 10 exists over an antenna 44. The data processing unit 10 receives data from the sensors 40 over this radio link and thus determines a position of the tennis racket 38 in space. Furthermore, the data processing unit 10 transmits control signals to the mechanical actuating means 42 over the radio link, the actuating means simulating a ball impact onto the tennis racket 38 by a corresponding mechanical excursion thereof so that the person 22 receives a tactile acknowledgement.

The above mentioned radio links are only an example, and other data links can also be used, for example glass fiber cables, an infrared or an ultrasonic connection or the like.

The dimensions of the court, the net height and width, the surface structure of the court (sand, lawn, carpet etc.) and other "fixed" parameters are entered into the high-performance computer.

Furthermore, the anthropometric measures of a "virtual average athlete" are stored, as well as the "kinematic" parameters, i.e. the relationship of certain points of the body with each other (for example shoulder articulations, elbow, hip joints, knee etc.) during the execution of a course of movement. The dependence of the individual points on each other will be described in algorithms which describe, in the simplest case, the virtual athlete as a spring-mass-damper system with the possibility to vary certain parameters, for example those of the spring or damping elements.

The static and dynamic properties of the tennis racket 38 and of the virtual ball 21 are also entered, such as the racket size and shape, the oscillating behavior and the rigidity of the racket 38, the ball size and hardness, the surface structure of the ball 21 and other parameters.

The movement of the virtual ball 21 is calculated by the computer 10, in the case of the throwing up of the ball 21, for example for serving, by algorithms which describe a ballistic trajectory. However, by striking down the ball 21, this ballistic trajectory will be superimposed by algorithms through which the aerodynamic and rotation kinetic properties of the ball 21 are described. The computer 10 calculates the parameters from the entered parameters of the racket 38 and of the ball 21, as well as from the angular position of the racket 38 when hitting the ball 21 (spin) and the impact speed of the racket 38 onto the ball 21.

The respective position of the ball 21 is made externally visible by the two laser beams 18 and 20 which cross in one point. The ball 21 is respectively exactly in this crossing point. Both "laser guns" 14 and 16 are controlled by the above mentioned algorithms. In this way, any flight path curves of the ball 21 can be described and any flying speeds of the ball 21 can be simulated. However, the player 22 does not see any laser beams 18, 20 in the cyberspace mask 24 but a virtual tennis ball 21 at the respective crossing point of the two beams 18 and 20.

With the hitting of the racket 38 onto the ball 21 (crossing point of both laser beams 18, 20), the racket 38—and thus the player 22—receives over corresponding sensors 40 and mechanisms 42 on the racket 38 a speed-depending tactile acknowledgement with the result that the player 22 has the impression to play with a real ball. Sensors 40 placed at different places on the prepared racket 38 additionally give the information where the "ball" 21 did hit on the playing surface of the racket 38. This information is necessary since the striking-down characteristic of the ball 21 depends on the point of impact on the racket 38. On the other hand, the player 22 needs a tactile information where the ball 21 has hit on the racket 38.

On the base of these data, the computer 10 calculates for example the course of movement of an "ideal" service for the virtual athlete by taking into account the above mentioned parameters. The algorithms calculated here are the "original pattern" or the "reference" in the computer with which all the "real" courses of movement are compared.

The learner 22 enters his anthropometric measures into the computer 10 as well as the parameters of its racket 38 and of the ball 21.

Equipped with data gloves 26 and data shoes 30, the learner 22 executes standardized courses of movement. The computer 10 determines therefrom the personal kinematic movement patterns and movement possibilities of the learner 22.

On the base of these "real" data, the computer 10 calculates the ideal course of movement preliminarly calculated on the virtual athlete (for example of a service) in order to adapt it to the anthropometric and kinematic measures of the real learner 22 and on request virtually represents the movement of the learner.

During the training, the learner 22 has a cyberspace mask 24 on and has data gloves 28 on his hands and data shoes 30 on his feet which digitalize his movements and continuously enter them into a computer 10.

In the first step, the learner 22 has the possibility to look at his own ideal course of movement in the cyberspace mask 24. This course is generated by the computer 10 on the base of the course optimized on the virtual athlete, converted to the data of the learner 22.

By executing a service, the learner 22 looks at himself in the cyberspace mask 24, namely in three dimensions, i.e. he can observe himself from the front, from behind or from the side. Here, he sees himself executing an ideal service and can impress its course of movement exactly in his mind while he lets perform his own "ideal" course of movement as often, as slowly as he likes and observed from any angle of view.

In the second step, the learner 22 executes an effective service. The computer 10 superimposes this effective course of movement of the learner 22 with his ideal course of movement. The learner 22 sees himself twice in vitro in the cybermask 24: once an effective course of movement, on the other hand his ideal course of movement, at his own request carried out either simultaneously or alternately. He distinctly recognizes the difference between the nominal and the actual course. The divergences will be important at the beginning, but will make the learner 22 virtually clearly recognizable where exactly the divergences are.

In the third step, the learner 22 now tries to clear away these divergences, i.e. to adapt his effective course of movement more and more exactly to his own ideal course of movement. The progress will be very quick.

In the fourth step, the learner 22 only sees his effective course of movement which already corresponds to the ideal course to a large extent. His "ideal" course of movement is blanked out. By "experience" (remaining under defined tolerance values), the computer 10 now "knows" in which points the learner 22 tends to differ from his ideal course of movement. These "critical points" are stressed in a harsh color by the computer 10, namely until the effective course corresponds to the ideal course or approaches it sufficiently (remaining under defined tolerance values).

With this method of training, the learner 22 learns very quickly and very effectively the ideal course of movement for certain strokes. Prepared in this manner, he applies these strokes on the real court with the consequence that he either executes as often as possible the ideal course of movement of a stroke, or approaches the ideal course of movement as close as possible. The confidence to "know how" to execute an ideal stroke and the experience of his own ability will place him in a position to learn very quickly the playful connection and application of the individually practiced and programmed in courses of movement.

The invention is not limited to the basis training of beginners but follows the ability of a player at any playing level. It integrates the following 3 fields:

1. Basis Training

The aim of this training is the practicing of certain basis strokes such as service, forehand and backhand, the ideal course of movement being trained from the beginning. Even with this very effective method of training, it will take some time until the learner 22 has "found" his ideal movement. To find it and to practice it will remain a challenge for quite a long time.

2. Advanced Training

The advanced learner 22 has the opportunity to train further standard strokes until he also masters these "standard strokes".

At any time, the player 22 can and should pursue the training of these strokes practiced with this method in reality, thus on a real court. Here, it is important to apply the practiced strokes to a real playing process.

3. Top Training

The particular challenge and the advantage of the invention furthermore consists, among others, in giving the opportunity to the player 22 to practice strokes which he never executed until now. To try and to train these strokes will remain an everlasting challenge.

The basic idea of this last mentioned challenge consists in the fact that most of the tennis players have enough to do to practice certain "standard strokes". Since these strokes have a unequal level of difficulty, the conventionally trained player 22 will perfect in the course of time some of them, the level of difficulty of which is only low, and only passably well master others which are more difficult and which are more unusual in the course of a play. But there are still other theoretically conceivable strokes which are never executed because the player 22 has no idea how he should execute them and thus never looks for the opportunity to practice them.

He first lets take place these strokes in his mind and then enters certain parameters of this stroke into the computer 10, for example own position, desired point of contact of the ball 21 and desired bouncing angle etc. The computer 10 calculates therefrom the necessary trajectory and movement of the ball 21 and represents how the player 22 should move in order to direct the ball 21 directly onto this trajectory. The task of the player 22 now consists in executing this movement in reality and in letting the computer 10 observe, compare and correct himself until he has understood and practiced the ideal course of movement (and so on, see above). In this way, the player 22 can train almost any number of strokes, any creative and difficult strokes.

There are almost no limits for him; on the contrary, compared to traditional training methods, this method has the advantage not to let the player 22 practice any strokes which are stupid, theoretically not possible or detrimental to health but strokes which are theoretically conceivable, kinematically realizable and undetrimental to health or even desirable.

Once correctly programmed, these possibilities of the computer 10 are almost unlimited. Due to the continuous supervision of the player 22, it can, for example, exactly detect the state of condition of the player 22 and give condition hints in case of deficiencies or even warning from impending overstress.

In a further step, the invention can be used to execute an effective tennis match in a virtual environment. For this purpose, the player 22 has again his mask 24 on, has data gloves 28 and data shoes 30 on and uses a special racket 38.

In his cyberspace mask 24, he is himself in situ on a virtual court. Thus, he sees the court and the opponent in front of himself. His own playing surface corresponds to the size of a normal half court in order to give him all the necessary room to move.

Alternatively, a minimal court is also provided on which the player 22 executes only minimal movements which are transferred by the computer 10 to the virtual court as if the player 22 would do widely swinging movements. However, the aim of this invention is not to minimize the sport but to increase the pleasure to play and to encourage and to optimize the physical sports performance.

The player 22 now virtually plays against an opponent. This form of play has the following advantages compared to reality:

The player 22 can alternatively let the opponent play back the balls 21 exactly as he would like them to be placed, for example to train certain strokes again and again.

The playing strength of the petitor can be adjusted as desired so that a challenge of any importance can be adjusted.

Over the kinematic and anthropometric parameters of specific individuals stored in the computer 10, the player 22 can train against very specific persons and manipulate their playing strength at will.

A play against himself is also possible with the advantage to see oneself from the view of the opponent and thus to identify and to eliminate the weak points which he can recognize.

The environment of the court can be changed at will with respect, for example, to the position of the sun (dazzling), wind influence, light intensity, ground structure (sand, lawn, carpet) etc.

Parameters such as hardness of the racket, strings of the racket, hardness of the ball, ball surface etc. can be adjusted at will. The player 22 can thus test in a simple manner its optimal sports appliances such as the ball 21 and the racket 38 before he buys them to play on a real court.

The training device according to the invention can be used at any time, and all year round, does not know any dependence on the weather, any limitation as to space, the problem of a missing playing partner and any restriction due to the generation of neighborhood noise.

The training device according to the invention makes possible a didactically optimally structured training with a corresponding quick training success, which will lend wings to the pleasure in playing tennis, to achieve a playing strength which cannot generally be achieved for the conventionally trained average player, to open a new playing creativity by using strokes which, due to their complexity for the average player, cannot be conventionally learned, the optimization of the physical condition of the player 22 due to the continuous supervision of its state of condition, a more economical use of a big part of the existing playing courts by dividing into half the space required and the integration of further target groups into this kind of sport, since due to the observation of the own virtually represented courses of movement and of its didactically optimally represented observation and correction possibility, relatively "unathletic" and "untrained" people can train. Add to this the fact that due to the adjustability of the playing strength of the opponent a corresponding sparring partner is always available and at any time.

What is claimed is:

1. A training device (100) for training the course of movement of a person (22) by manipulating an object (38) to be moved by the person (22) in a predetermined manner, wherein a data processing unit (10), first sensors (28, 30) connected with the data processing unit (10) and adapted to be placed on a person (22)

which transmit first data in connection with the movement of the person (22) to the data processing unit (10, second sensors (40) connected with the data processing unit (10) and adapted to be placed on an object (38) which transmit second data in connection with the movement of the object (38) to the data processing unit (10), mechanical actuating means (42) connected with the data processing unit (10) and adapted to be placed on the object (38) which, actuated triggered by the data processing unit (10), simulate a contact with a virtual object (21) as a tactile acknowledgement to the person (22), an indicating means (26) connected with the data processing unit (10) and adapted to be placed on the person (22) and a memory (12) for reference data, whereby the data processing unit (10) is constructed in such a way that it calculates an ideal course of movement of body and object (38) from the reference data and alternatively represents
  (a) the ideal course of movement in the indicating means or
  (b) compares the ideal course of movement with an effective course of movement which results from the first and second data of the first and second sensors (28, 30, 40) or
  (c) simultaneously represents in the indicating means (26) the ideal course of movement and the effective course of movement detected by means of the first and second sensors (28, 30, 40).

2. A training device (100) according to claim 1, wherein that the data processing unit (10) furthermore is constructed in such a way that, from the reference data and the first and second data, it calculates a movement trajectory of the virtual object (21) in space and represents it on the indicating means (26).

3. A training device (100) according to claim 1, wherein the object (38) is a sports apparatus, for example a tennis racket, a badminton racket, a table tennis racket, a squash racket, a golf club, a baseball bat, a throwing hammer, a hockey stick, a ball racket, a javelin, skis, snowboards, skates, or the like.

4. A training device (100) according to any of the claim 1, wherein
the object (38) is a javelin, a racket, an epee, a foil, an axe, a defensive weapon or the like.

5. A training device (100) according to any of the claim 1, wherein
the virtual object (21) is a ball or a virtual person and/or a virtual object led by the virtual person.

6. A training device (100) claim 1, wherein
the first sensors (28, 30) are data gloves (28) and/or data shoes (30).

7. A training device (100) according to claim 1, wherein the indicating means (26) is a display.

8. A training device (100) according to claim 1, wherein the indicating means (26) is integrated into a helmet (24) or a cap placed on the head of the person (22).

9. A training device (100) according to claim 1, wherein the reference data comprise anthropometric measures and/or kinematic parameters of the body of an average person and the ideal course of movement is determined on the base of these data.

10. A training device (100) according to claim 1, wherein the reference data comprise anthropometric measures and/or kinematic parameters of the person (22) and the ideal course of movement is determined on the base of these data.

11. A training device (100) according to claim 1, wherein the reference data comprise static and dynamic properties of the object (38).

12. A training device (100) according to claim 1, wherein the reference data comprise dimensions of a court, a net height, a net width, a surface structure of a place such as, for example sand, lawn or carpet, and/or further fixed parameters.

13. A training device (100) according to claim 1, wherein in case (c) the data processing unit (10) is constructed in such a way that divergences of the effective course of movement detected by the first and second sensors (28, 30, 40) from the ideal course of movement are visually stressed in the indicating means (26), for example, in color.

14. A training device (100) according to claim 1, wherein in case (b) the data processing unit (10) is constructed in such a way that, from the comparison of the courses of movement, there emerge data which correspond to divergences between the courses of movement.

15. A training device (100) according to claim 1, wherein two lasers (14, 16) connected with the data processing unit (10) and controlled by the data processing unit are provided for, the crossing point of their laser beams (18, 20) corresponding to the place in space of the virtual object (21).

16. A training device (100) according to claim 1, wherein several virtual objects (21) are provided for, two laser beams (18, 20) being assigned to each virtual object (21) and the respective crossing point of two laser beams (18, 20) corresponding to a place in space of the respective virtual object (21).

* * * * *